United States Patent [19]
Reiser

[11] 3,741,017
[45] June 26, 1973

[54] UNBALANCE DETECTOR

[76] Inventor: Alfred A. Reiser, 6976 Old Lake Shore Road, Lakeview, N.Y. 14085

[22] Filed: Sept. 23, 1971

[21] Appl. No.: 183,143

[52] U.S. Cl. .................................................. 73/480
[51] Int. Cl. ....................... G01m 1/12, G01m 1/16
[58] Field of Search ...................... 73/66, 459, 480, 73/462

[56] References Cited
UNITED STATES PATENTS

| | | | |
|---|---|---|---|
| 1,763,402 | 6/1930 | Lundgren | 73/480 |
| 1,995,061 | 3/1935 | Hanford et al. | 73/480 |
| 3,344,674 | 10/1967 | Lane | 73/480 |
| 3,581,576 | 6/1971 | Reiser | 73/459 |

Primary Examiner—James J. Gill
Attorney—Sommer & Weber

[57] ABSTRACT

Apparatus for detecting the location of a point of unbalance and also preferably the amount of unbalance in a rotatable body such as a vehicle tire-wheel assembly, comprising means for detecting when the torque produced by the gravitational effect of the point of unbalance in the body when supported for rotation about a non-vertical axis produces it maximum effect thereby to determine the location of said point of unbalance and also preferably means for measuring the value of such maximum torque thereby to determine the amount of unbalance.

13 Claims, 9 Drawing Figures

PATENTED JUN 26 1973 3,741,017

INVENTOR.
ALFRED A. REISER
BY Sommer, Weber & Gastel
ATTORNEYS

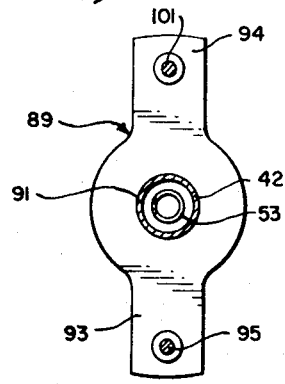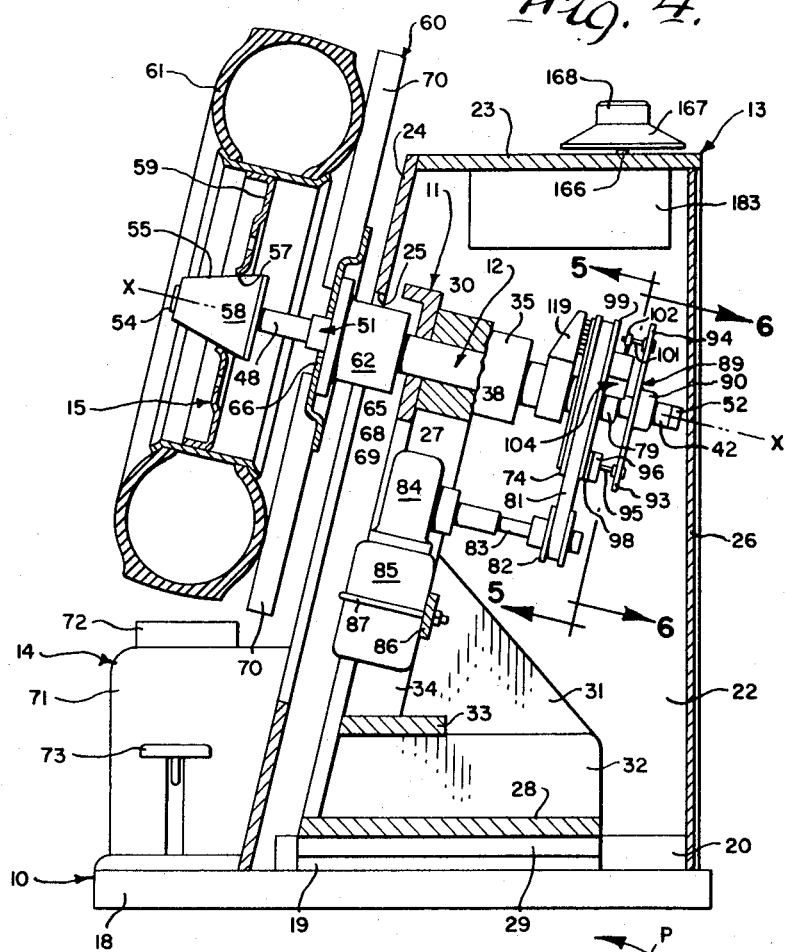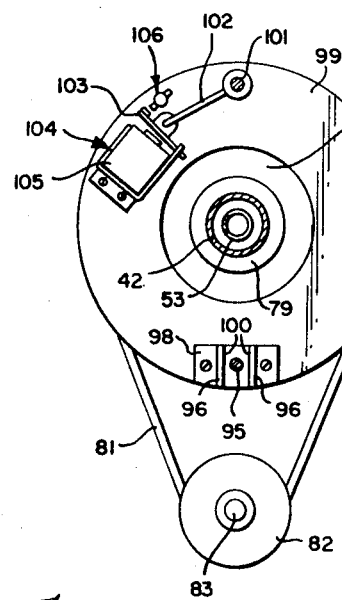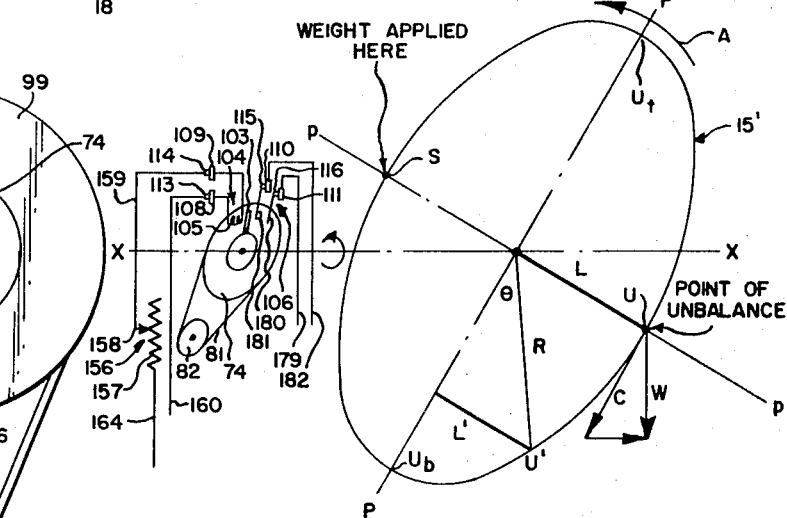

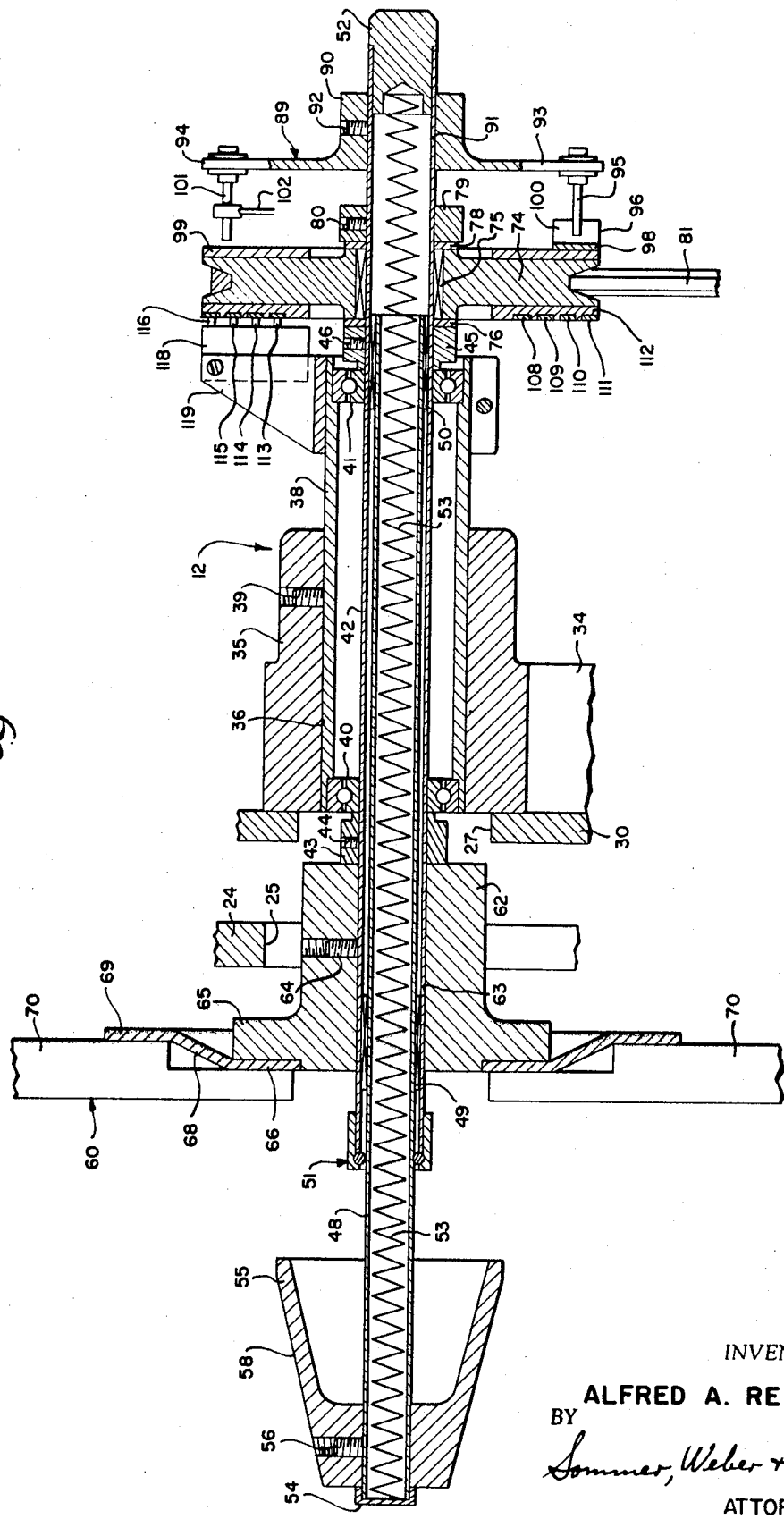

UNBALANCE DETECTOR

BACKGROUND OF THE INVENTION

This invention relates to the field of detecting the location of a point of unbalance in a rotatable body supported for rotation about a non-vertical axis. The invention has particularly advantageous application to the balancing of a tire-wheel assembly such as used on passenger automobiles and light trucks by the addition of suitable weights to counteract the point of unbalance assumed to be a point of overweight. If such a tire-wheel assembly is out of balance it will produce vibrations in the vehicle, particularly when driven at higher speeds, and also will cause uneven wear in the tire and shorten its effective life. While unbalance detectors for detecting the location of a point of unbalance in a tire-wheel assembly are known, none has been fully satisfactory in detecting the precise location of the point of unbalance and also in measuring the amount of unbalance.

SUMMARY OF THE INVENTION

The present invention relates to apparatus for detecting the location of the point of unbalance in a rotatable body such as a tire-wheel assembly of the type used on conventional passenger automobiles and like trucks, hereinafter sometimes referred to as an unbalance detector.

An object of the invention is to detect the location of a point of unbalance in such a tire-wheel assembly with preciseness.

A secondary and related object of the invention is to provide apparatus which as well measures the amount of unbalance so that a weight of the proper size can be affixed to the rim of the wheel in a manner well known in this art of wheel balancing thereby to overcome the condition of unbalance during rotation of the tire-wheel assembly.

Another object of the present invention is to provide such apparatus which does not rely on centrifugal force in detecting the unbalance as with some prior art modes of detecting unbalance, but rather utilizes gravitational force only, it having been found that the apparatus of the present invention responds not only to so-called static unbalance but as well dynamic unbalance.

A further object of the invention is to provide an unbalance detector which is capable of detecting and measuring the condition of unbalance on various sized tires within a certain range when suitably mounted on a given size of vehicle wheel.

Still another object of the present invention is to provide such an unbalance detector which is capable of handling different sizes of vehicle wheels on which tires are mounted that may also vary in size.

While the invention has been indicated as being particularly suitable for use in detecting the unbalanced condition of tire-wheel assemblies as used on conventional passenger automobiles and light trucks, the detector can also be rendered suitable for detecting the unbalance on large truck and bus tires. Even beyond this, the present invention is applicable to providing apparatus that may be used in industry generally for detecting the unbalanced condition of a rotatable body that requires correction of such condition.

In accordance with the present invention, apparatus is provided for detecting the location of a point of unbalance in a rotatable body, comprising means for supporting such body for rotation about a non-vertical axis, the torque about such axis provided by the gravitational effect of such point of unbalance varying during rotation of the body, and detection means arranged to detect when the torque maximizes thereby to determine the location of the point of unbalance. Preferably, in addition, the apparatus also includes means for measuring the value of the maximum torque thereby to determine the amount of unbalance in the rotatable body.

Further objects and advantages of the present invention will be apparent from the following detailed description of a preferred embodiment shown in the accompanying drawings.

DESCRIPTION OF THE DRAWINGS

FIG. 4 is a vertical longitudinal sectional view thereof taken generally on line 4—4 of FIG. 1.

FIG. 5 is a generally vertical transverse sectional view thereof taken on line 5—5 of FIG. 4.

FIG. 6 is another generally vertical transverse sectional view thereof taken on line 6—6 of FIG. 4.

FIG. 7 is an enlarged fragmentary longitudinal sectional view thereof taken on line 7—7 of FIG. 2.

FIG. 9 is a perspective schematic view illustrating the principal parts that are involved in the detection of the location of unbalance and the measurement of the amount thereof.

DESCRIPTION OF THE PREFERRED EMBODIMENT

Figure 1:
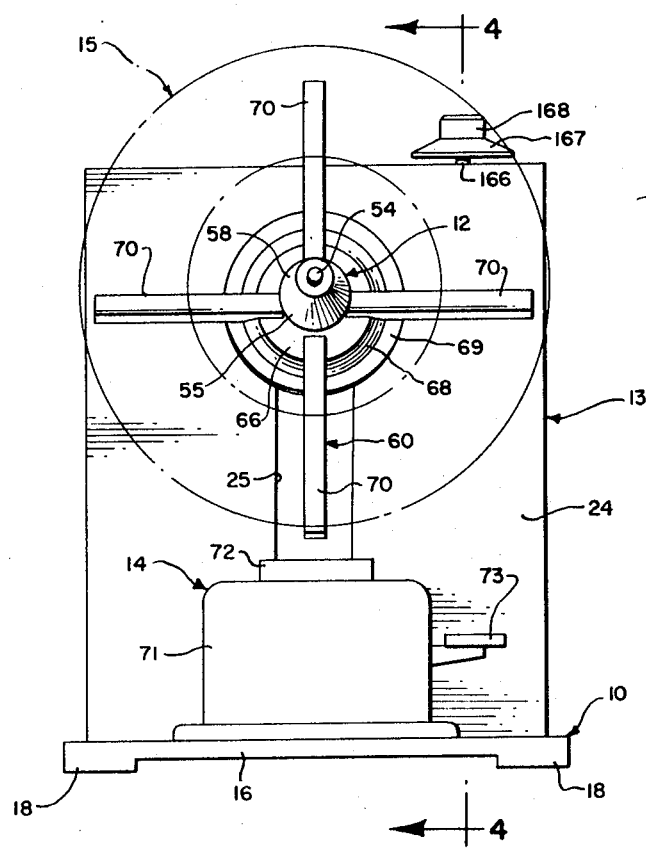
FIG. 1 is a front elevational view of an unbalance detector constructed in accordance with the principles of the present invention and representing a preferred embodiment thereof.

The preferred embodiment of the present invention is shown as including a base 10 supporting an inner frame 11 on which a shaft assembly 12 is arranged for rotation about a non-vertical axis X—X, a casing 13, and lift means 14 for raising and lowering a tire-wheel assembly 15 (FIG. 4) on the forward and exposed end of this shaft assembly.

Base 10 is shown as comprising a horizontal rectangular plate 16 having a depending floor engaging foot 18 which extends fore and aft along each side of this plate. A pair of parallel laterally spaced inner and outer cleats 19 and 20, respectively, are shown as upstanding from the upper surface of plate 16, one adjacent each lateral side thereof.

Casing 13 is shown as including left and right side walls 21 and 22, respectively, a top wall 23, and an upwardly and rearwardly inclined front wall 24 having an opening 25 therein. The lower marginal portions of side walls 21 and 22 are arranged to embrace the outer lateral sides of outer cleats 20 and are suitably secured thereto by removable fasteners (not shown). The open rear side of casing 13 is shown as closed by a removable rear panel 26.

Inner frame 11 is shown as comprising a bottom plate 28 having a pair of parallel laterally spaced depending cleats 29, 29 which severally are set inwardly slightly from the lateral edges of this plate so that these cleats can engage the inner surfaces of inner base plate cleats 19 and with a marginal portion of bottom plate 28 overlying and resting on the upper surfaces of these cleats 19. Rising from the front edge of bottom plate 28 is an upwardly and rearwardly inclined front frame panel 30 supported in this inclined position by lateral gusset plates 31,31. Panel 30 has an opening 27 therein. Arranged inwardly of each of these gusset plates is a cleat 32 and across such cleats 32 rests a horizontal shelf 33. Rising from this shelf centrally thereof and on the rear side of panel 30 is a pair of parallel laterally spaced upright frame members 34,34. The various above-described elements of inner frame 11 are suitably secured together and this frame as a unit is suitably secured to base 10 by removable fasteners (not shown).

As best shown in FIG. 7, shaft assembly 12 is shown as comprising a support member 35 suitably rigidly mounted on inner frame 11 between the uprights 34 thereof. This member 35 has a cylindrical bore 36 in which a stationary bearing housing sleeve 38 is arranged. This sleeve is secured to this support member and held against both rotative and longitudinal movement relative thereto by a set screw 39 arranged in an internally threaded hole provided in member 35 and at its inner end bearing against sleeve 38. At its front or left end as viewed in FIG. 7 sleeve 38 is counterbored to accommodate a front ball bearing 40 and the rear end of this sleeve is similarly counterbored to accommodate a rear ball bearing 41.

An outer tubular shaft 42 extends through the bores of the inner races of bearings 40 and 41 and is held against longitudinal displacement relative to these bearings by a front collar 43 bearing against the front face of the inner race of front bearing 40 and having a radial set screw 44 which bears against the outer surface of this shaft, and a similar rear collar 45 bearing against the rear face of the inner race of rear bearing 41 and also having a radial set screw 46 bearing against this shaft.

Slidably arranged within outer tubular shaft 42 is a concentric inner tubular shaft 48, being supported thereon by a front sleeve bushing 49 and a rear sleeve bushing 50 both of which are suitably secured to outer shaft 42. A dust seal assembly 51 of any suitable construction is shown as closing the annular space between the tubular shafts 42 and 48 at the front end of the outer shaft 42.

Outer tubular shaft 42 extends rearwardly beyond the rear end of inner tubular shaft 48 and is closed at its rear end by a suitable plug 52. Bearing against the recessed front face of this plug is one end of a helical compression spring 53 the front end of which bears against an end cap 54 suitably fastened to the front end of the inner tubular shaft 48. Immediately behind this front end cap is shown a wheel hub support member 55 fast to inner tubular shaft 48, this being shown as accomplished by a set screw 56 arranged in an internally threaded radial hole in member 55, the inner end of which screw bears against the outer surface of this shaft. The outer peripheral surface 58 of this hub member is frustoconical in configuration and adapted to penetrate the opening 57 in the center of a vehicle wheel 59 of conventional construction and forming part of assembly 15 as depicted in FIG. 4. The conical shape is to accommodate wheel openings such as 57 of different diameters.

Fast to outer tubular shaft 42 between front collar 43 and dust seal assembly 51 is a spider assembly 60 adapted to engage the sidewall of a tire 61 when mounted on assembly 15, as depicted in FIG. 4. This spider assembly is shown as comprising a hub member 62 having a bore 63 through which outer tubular shaft 42 extends. A set screw 64 arranged in an internally threaded radial hole in hub member 62 bears against the outer surface of outer tubular shaft 42 so as to secure the spider assembly to this shaft against rotative and longitudinal movement relative thereto. The hub member 62 at its front end is shown as having an integral outturned annular flange 65 recessed on its front face to receive the inner marginal radial portion 66 of a ring plate 68 having a rearwardly offset outer marginal radial portion 69. Against the forward faces of the inner and outer marginal portions 66 and 69 and at equidistant circumferentially spaced intervals are a series of radial arms 70, four being shown although any other suitable number may be employed. These arms 70 are suitably secured to ring plate 68 which in turn is suitably secured to flange 65 of hub member 62.

Lift means 14 may be of any suitable construction. As shown, such means comprises a box-like housing 71 for a vertically movable lift 72 operated by a foot pedal 73 projecting through an opening in the left side of this housing. Housing 71 is arranged against the front face of casing front wall 24. When pedal 73 is depressed, lift 72 rises. It lowers automatically when pedal 73 is released.

Figure 3:
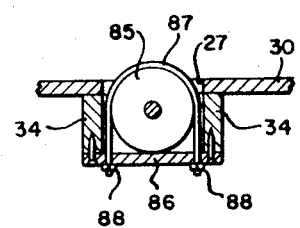
FIG. 3 is a fragmentary horizontal sectional view thereof taken on line 3—3 of FIG. 2.

Means are provided for rotating shaft assembly 12 about axis X—X and thereby the tire-wheel assembly 15 arranged thereon. While such means may be variously constructed, the same are shown as comprising a driven pulley 74 journaled by needle bearing 75 on outer tubular shaft 42 adjacent its rear end. A front thrust washer 76 is shown as arranged between rear collar 45 and the front end face of the hub of pulley 74. A similar thrust washer 78 is shown as arranged between the rear end face of the hub of this pulley and the front face of a collar 79 surrounding outer tubular shaft 42 and secured thereto by a set screw 80 arranged in an internally threaded radial hole in this collar. A belt 81 passes around the annular groove of pulley 74 and also passes around the annular groove of a drive pulley 82 mounted on the rear end of an output shaft 83 of a gear reducer 84 of any suitable construction driven by an electric motor 85. This gear reducer and electric motor are suitably joined together to provide a unitary structure which is secured between and to the uprights 34 of inner frame 11 by arranging the motor between such uprights. A transverse strap 86 extends across the rear of drive motor 85 and is suitably secured to the rear edge faces of such uprights, and a U-bolt 87 extends around the forward side of the motor and passes through holes provided in this strap, nuts 88 being arranged on the ends of this U-bolt and bearing against the rear face of the strap, as best shown in FIG. 3. It will be noted that driven pulley 74 is freely rotatably mounted on outer tubular shaft 42 although constrained against longitudinal movement relative thereto.

Arranged in rear of and in spaced relation to driven pulley 74 is a torque arm member 89 including a hub 90 having a bore 91 receiving the rear end portion of outer tubular shaft 42 and secured thereto by a set screw 92 arranged in an internally threaded hole provided in this hub. This member is shown as having a first radial torque arm 93 and a second radial torque arm 94 diametrically opposed thereto, but this diametrically opposite arrangement is not essential. The outer end of arm 93 carries a forwardly projecting finger 95 suitably secured thereto. The front end portion of this finger is shown as arranged between two circumferentially spaced generally radially arranged flanges 96,96 outstanding rearwardly from the rear face of driven pulley 74. These flanges are part of a bracket 98 suitably secured to a ring plate 99 in turn suitably secured to the rear face of driven pulley 74. The spacing between the inner opposing faces 100 of these flanges is greater than the diameter of the front end portion of finger 95 arranged therebetween so that there is some lost motion as this finger moves from one face 100 toward the other face 100.

The other torque arm 94 at its outer end carries a forwardly projecting pin 101 suitably secured thereto which is pivotally connected by a link 102 to the pivotally movable armature 103 of a solenoid 104 including a coil 105. This solenoid including its coil and armature are suitably mounted on the rear face of driven pulley plate 99 so as to rotate with driven pulley 74. Arranged on the side of armature 103 opposite from coil 105 is a normally open switch 106 adapted to be closed by this armature when it moves away from this coil.

The front side of driven pulley 74 is shown as carrying four radially spaced annular contact rings 108, 109, 110 and 111 which are recessed in a ring plate 112 of insulating material suitably secured to the front face of this pulley, each of these rings being engaged by a stationary wiper contact 113, 114, 115 and 116, respectively, suitably supported on an insulation block 118 mounted on a bracket 119 suitably clamped to housing sleeve 38. The ends of solenoid coil 105 are electrically connected severally to rings 108 and 109 as are the contacts of switch 106 to rings 110 and 111.

Figure 2:
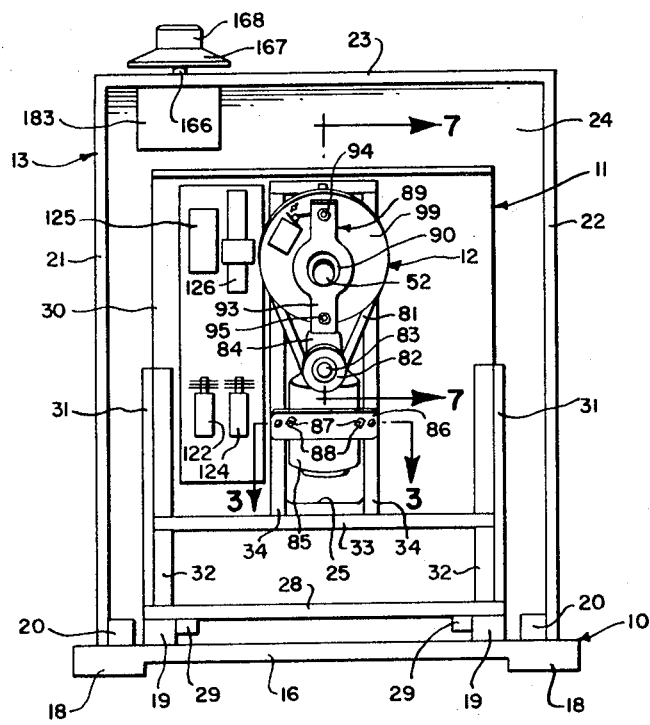
FIG. 2 is a rear elevational view thereof with the rear casing panel removed so as to expose other parts.

The electrical circuit means for the unbalance detector as diagrammed in FIG. 8 will now be described. Power lines 120 and 121 connected to a suitable source of electrical power such as 115 volts-AC lead to a first transformer-rectifier assembly 122 capable of producing a 24 volt-DC output. This assembly is shown as being in series via a conductor 123 with a second similar transformer-rectifier assembly 124. These assemblies 122 and 124 are shown in FIG. 2 as being arranged on the rear side of front panel 30 of inner frame 11. On this same panel and arranged above these transformer-rectifier assemblies are two relays 125 and 126.

Referring to FIG. 8 again, relay 125 is shown as including a coil 128, a first pair of contacts including a stationary contact 129 and a movable contact 130, and a second pair of contacts including a stationary contact 131 and a movable contact 132. One terminal 133 of drive motor 85 is shown as being connected to movable contact 130 via a conductor 134. Companion contact 129 is shown as connected to power line 120 by a conductor 135. The other terminal 136 of drive motor 85 is connected to the other power line 121 by a conductor 138. An input conductor 139 connects conductor 138 to transformer-rectifier assembly 124. The other input side of this assembly is connected via an input conductor 140 to motor terminal 133.

Relay 126 is a time delay relay of any suitable construction and is shown as having a coil 141, and a pair of contacts including a stationary contact 142 and a movable contact 143. This stationary contact is shown as connected to terminal 133 on drive motor 85 by a conductor 144. The movable companion contact 143 is connected via a conductor 145 to one terminal 146 of a potentiometer motor 148. The other terminal 149 of this motor is connected via a conductor 150 to terminal 136 of drive motor 85. One side of coil 141 of relay 126 is connected via a conductor 151 to conductor 150, and the other side of this coil is connected via a conductor 152 to conductor 144.

Adverting again to relay 125, the coil 128 thereof is shown as being connected on one side via a conductor 153 to movable contact 132. The stationary companion contact 131 is shown as connected via a conductor 154 to the positive output terminal of transformer-rectifier assembly 122. The other side of coil 128 of relay 125 is shown as connected via a conductor 155 to the series conductor 123 between the transformer-rectifier assemblies 122 and 124.

Motor 148 drives a potentiometer 156 including a resistance element 157 adapted to be traversed by a movable wiper contact 158. This contact is connected via a conductor 159 to one side of the coil 105 of solenoid 104, the other side of which is connected via a conductor 160 to the negative output terminal of transformer-rectifier assembly 124. Connected in series with potentiometer 156 is a manually adjustable resistor 161 which includes a resistance element 162 and a movable wiper contact 163, the latter at one end being connected by a conductor 164 to one end of the resistance element 157 of the potentiometer. The other end of resistance element 162 is connected via a conductor 165 to conductor 154 leading to the positive output terminal of transformer-rectifier assembly 122.

Movable contact 158 of potentiometer 156 is fast to a manually settable shaft 166 shown in FIGS. 1, 2 and 4 to the upper end of which a knob 168 is fast having a dial 167 calibrated in ounces. This shaft is also capable of being driven by motor 148 when energized through a suitable speed reducer (not shown), such drive connection being represented by the broken line 166' in FIG. 8. When knob 168 is manipulated as by rotating shaft 166 counter-clockwise as viewed from above in FIGS. 1, 2 and 4, and as viewed in FIG. 8 for shaft 166', it actuates the movable contacts 169 and 170 of two pairs of contacts, the mechanical connection between these movable contacts being represented by the broken line 166'' in FIG. 8. Movable contact 169 is one element of a normally closed switch 171 having a stationary contact 172. The other movable contact 170 is one element of a normally open switch 173 having a stationary contact 174. Movable contact 169 of switch 171 is connected via a conductor 175 to stationary contact 174 of the other switch 173. This stationary contact 174 is shown as connected via a conductor 176 to conductor 153. Movable contact 170 of switch 173 is shown as connected via a conductor 178 to conductor 165. Stationary contact 172 of switch 171 is shown as connected via a conductor 179 to the stationary contact 180 of normally open switch 106. The movable contact 181 for this switch is shown as connected via a conductor 182 to the series conductor 123 between transformer-rectifier assemblies 122 and 124. This movable contact 181 is adapted to be engaged by armature 103 of solenoid 104 and closed against stationary contact 180.

Potentiometer 156, its drive motor 148, adjustable resistor 161, and switches 171 and 173 are arranged in a housing 183 mounted on the bottom surface of top wall 23 of casing 13 with shaft 166 extending upwardly through a hole provided in this top wall. Knob 168 is fast to the upper end of this shaft 166 and is arranged above top wall 23.

OPERATION

A tire-wheel assembly 15 to be balanced is positioned on lift 72 with the tread of the tire resting on the upper surface of this lift. The operator then depresses pedal 73 so as to elevate the lift and raise the tire-wheel assembly so that the opening 57 in the wheel 59 thereof can be placed over conical member 55. The pedal is then released allowing lift 72 to lower to the position shown in FIGS. 1 and 4. The tire-wheel assembly 15 is pushed rearwardly until the sidewall of the tire 61 engages the arms 70 of spider 60 as shown in FIG. 4. During this placement, inner tubular shaft 48 can move rearwardly within outer tubular shaft 42, against the urging of spring 53. This assures a tight fit between the conical periphery 58 of member 55 with the hole 57 in wheel 59 and a concentric mounting of tire-wheel assembly 15 with respect to shaft assembly 12.

Figure 8:
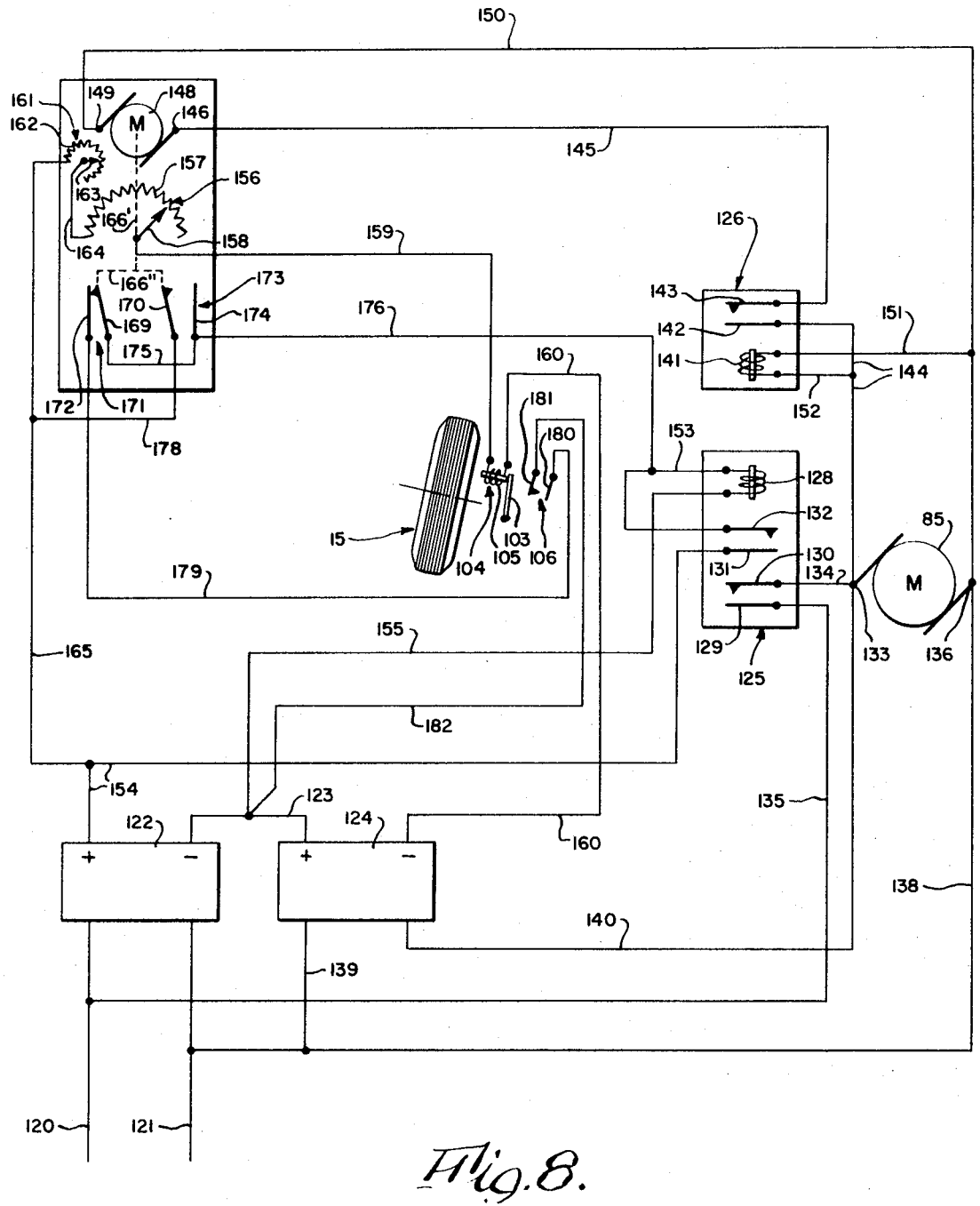
FIG. 8 is an electrical circuit diagram of the unbalance detector.

Knob 168 is then turned fully in a counter-clockwise direction as viewed from above so as to rotate shaft 166, depicted as shaft 166' in FIG. 8, and hence wiper contact 158 of potentiometer 156 to the left end of the resistance element 157 thereof. From this point on, the apparatus functions automatically to determine the position of the principal point of overweight unbalance in the tire-wheel assembly 15 and to indicate the amount of this overweight. This indication will occur when rotation of the tire-wheel assembly stops and the rotation of the knob 168 with its dial 167 ceases.

In FIG. 9, the tire-wheel assembly is indicated at 15', the point of overweight unbalance is indicated at U, and the direction of rotation of assembly 15' is represented by the arrow A. When rotation of the tire-wheel assembly 15' stops the point at which compensating weight is to be applied will be at point S, diametrically opposite from point U. The amount of weight that is to be applied to the rim of the wheel at this point S will be indicated on dial 167 at a suitable index point. At this time, point S can be marked on the tire surface with chalk, for example, with the amount of weight required. The tire-wheel assembly can then be removed from the detector and a suitable weight or weights (not shown) attached at point S in the amount called for, such weights being of conventional construction and attached to the rim of the wheel in a known manner.

Referring to FIG. 4, it will be seen that the axis X—X of shaft assembly 12 is inclined relative to the horizontal at an angle of about 15° although this angle is not critical so long as axis X—X is not vertical. This axis X—X is also depicted in FIG. 9. The purpose of this inclination is so that the gravitational effect at the point of unbalance U shown in FIG. 9 in any tire-wheel assembly 15' when mounted on shaft assembly 12 will have a force component C lying in a plane perpendicular to axis X—X, such as a plane having the coordinates P—P and $p$—$p$ depicted perspectively in FIG. 9. This force component C produces a torque, albeit variable, about axis X—X during rotation of the assembly 15' about this axis. In FIG. 9, vector C represents the force component of the always vertically acting overweight represented by the vector W at the point of unbalance U. While such force component C remains constant in value because it is always acting downwardly in the plane represented by the coordinates P—P and $p$—$p$ when viewed in a direction parallel to axis X—X, its lever arm L increases from zero at bottom dead center (point $U_b$) to a maximum at half-way (point U) toward top dead center, decreasing from such half-way point toward top dead center (point $U_t$) assuming the tire-wheel assembly 15' rotates in a counter-clockwise direction about axis X—X as depicted by arrow A in FIG. 9. Graphically the length of the lever arm L' for force component C at some intermediate point U', between points $U_b$ and U, is the radius R of the circle represented by line 15' in FIG. 9, times the sine of angle $\theta$ as depicted in FIG. 9. Thus when the point of unbalance is at bottom dead center $U_b$, L' is zero, but achieves its maximum length L at point U.

When solenoid 104 is excited its maximum amount, as when potentiometer 156 has a minimum effective resistance, this solenoid will attract its armature 103. A turning force is delivered to driven pulley 74 and through the solenoid-held armature 103 and link 103 the torque arm member 89 fast to outer tubular shaft 42 will rotate, thus rotating the tire-wheel assembly 15 non-rotatively mounted on this shaft. As the point of overweight U reaches the horizontal as shown in FIG. 9, the force component C will exert maximum torque on the torque arm member 89 in a clockwise direction through its maximum lever arm L. If at this time the magnetic flux in solenoid 104 has been reduced to a point where the force upon torque arm member 89 applied through link 102 can just exceed the holding force of solenoid 104 the armature 103 thereof will pull away from the coil 105 of the solenoid and engage movable contact 181 of switch 106. This will cause rotation of the tire-wheel assembly 15 to cease in the manner hereinafter explained and the rotation of the dial drive motor 148 to cease at the same moment as well. Thus the overweight point U will always lie at a location that will be on a horizontal line, such as depicted by line $p$—$p$ in FIG. 9, through the rotational axis X—X of the tire-wheel assembly 15 or 15', and the amount of unbalance existing at point U will be that which is related to the change that has occurred in resistance element 157 of potentiometer 156 from a minimum value of resistance to some higher level.

Comprehension of the automatic nature of the apparatus will be more evident from the ensuing description of the functional sequence relative to the electrical circuit shown in FIG. 8. When the operator turns knob 168 fully in a counter-clockwise direction, shaft 166' through its mechanical connection 166'' momentarily opens switch 171 and momentarily closes switch 173. This allows coil 128 of relay 125 to be energized in the following manner. Direct current from the positive output terminal of transformer-rectifier assembly 122 flows through a portion of conductor 154, conductors 165 and 178, now closed switch 173, conductors 176 and 153, coil 128, and conductors 155 and 123 back to the negative DC terminal of this transformer-rectifier assembly. Energization of relay coil 128 closes contacts 129-132. Closed contacts 131 and 132 establish a holding circuit for relay coil 128, including conductor 154, now closed contacts 131 and 132, conductor 153, relay coil 128, and conductors 155 and 123. Closing of contacts 129 and 130 establishes a circuit from one to the other of power lines 120 and 121 through drive motor 85. Such circuit includes power line 120, conductor 135, now closed contacts 129 and 130, conductor 134, motor terminal 133, drive motor 85, motor terminal 136, and conductor 138 leading to the other power line 121. Energization of drive motor 85 rotates pulley 82 to move belt 81 and drive pulley 74.

At the same time drive motor 85 is energized by an AC current as just described, the coil 105 of solenoid 104 is energized by 48 volts DC applied thereacross through a circuit which includes conductors 154 and 165, resistance element 162 and its wiper contact 163 of adjustable resistor 161, conductor 164 and the resistance element 165 and its wiper contact 158 of potentiometer 156, conductor 159, solenoid coil 105, and conductor 160 leading to the negative output terminal of transformer-rectifier assembly 124. The two 24 volt transformer-rectifier assemblies 122 and 124 in series provide the 48 volt DC source for solenoid coil 105. Assembly 124 is energized by reason of branch line 139 connecting one of its AC-input terminals to power line 121 through a portion of conductor 138, the other AC input terminal of this assembly being connected through conductor 140, motor terminal 133, conductor 134, now closed relay contacts 129 and 130, and conductor 135 to power line 120. As previously indicated energization of solenoid coil 105 with minimum resistance in the energization circuit produces the maximum magnetic flux to attract the armature 103 and hold it away from normally open switch 106.

Energization of drive motor 85 also results in simultaneous energization of coil 141 of time delay relay 126. The circuit establishing the energization of this coil 141 includes a portion of conductor 144, conductor 152, relay coil 141, conductor 151 and a portion of conductor 150, the conductors 144 and 150 being connected to the now live motor terminals 133 and 136, respectively. After relay 126 times out, its contacts 142 and 143 close, resulting in energization of motor 148 for driving wiper contact 158 of potentiometer 156. Assuming that this relay has timed out and contacts 142 and 143 are closed, an energizing circuit is established through motor 148 which includes conductor 144, now closed contacts 142 and 143, conductor 145, motor terminal 146, motor 148, motor terminal 149, and conductor 150, these conductors 144 and 150 being electrically connected to still live motor terminals 133 and 136, respectively.

With motor 148 energized, wiper contact 158 of potentiometer 156 moves in a clockwise direction over resistance element 157. This has the effect of introducing a progressively increasing amount of resistance in the circuit in which solenoid coil 105 is arranged, thus reducing the effective magnetic flux produced thereby. Adjustable resistor 161 had been previously adjusted to provide the starting position of potentiometer 156 at the desired resistance level. Wiper contact 158 of potentiometer 156 traverses resistance element 157 in a clockwise direction as viewed in FIG. 8. This also rotates shaft 166' (shaft 166) and knob 168 with its dial 167. This dial is calibrated in ounces of unbalance determined empirically.

When the torque produced by component C exceeds the effect of the holding force produced by energization of solenoid coil 108, armature 103 moves away from this coil and engages movable contact 181 of switch 106, closing this switch. Closing of switch 106 establishes a tripping circuit which operates to deenergize coil 128 of relay 125, thus deenergizing motors 85 and 148 and also coil 141 of relay 126. The tripping circuit deenergizing relay coil 128 includes conductor 182, now closed contacts 181 and 180 of switch 106, conductor 179, closed switch 171, connected conductors 175, 176 and 153, relay coil 128, and conductor 155. Thus, when normally open switch 106 is momentarily closed, it serves to deenergize relay coil 128 and allows contacts 129–132 of relay 125 to open and stay open. The tripping of this relay serves to stop motors 85 and 148, resets time delay relay 126 by opening its contacts 142 and 143, and at the same time cuts off power to transformer-rectifier assembly 124, this latter by opening contacts 129 and 130.

In this manner the tire-wheel assembly 15 or 15' is stopped in its rotation when point U is in a horizontal position indicating that a weight (not shown) is to be applied at point S. The value of this weight is indicated by the calibrated position of dial 167. The tire-wheel assembly is removed from the unbalance detector and the indicated amount of weight is applied to the wheel rim at point S the location of which had been previously suitably marked on the tire.

When the unbalance detector is to be used again another tire-wheel assembly is mounted on shaft assembly 12 and the knob 168 turned to its starting position to begin another cycle of operation.

What is claimed is:

1. Apparatus for detecting the location of a point of unbalance in a rotatable body, comprising means for supporting said body for rotation about a non-vertical axis, rotation means for rotating said body about said axis, the torque about said axis produced by the gravitational effect of said point of unbalance varying during rotation of said body, detection means arranged to detect when said torque maximizes thereby to determine the location of said point of unbalance, and means for stopping said rotation means when said detection means detects the maximum torque.

2. Apparatus according to claim 1 wherein said detection means comprises a solenoid including a coil and armature, connection means operatively connecting said armature to said body for rotation therewith about said axis, mounting means mounting said coil for limited movement relative to said armature, and current varying means for progressively varying the current supplied to said coil, the point at which said armature moves relative to said coil determining said location.

3. Apparatus according to claim 2 wherein said current varying means progressively decreases the current supplied to said coil, the point at which the maximum torque effect of said point of unbalance just overcomes the electromagnetic attractive effect of said coil on said armature to allow said armature to move relative to said coil determining said location.

4. Apparatus according to claim 2 wherein said means for stopping said rotation means is operative in response to movement of said armature relative to said coil thereby to determine said location.

5. Apparatus according to claim 3 wherein said means for stopping said rotation means is operative in response to movement of said armature relative to said coil thereby to determine said location.

6. Apparatus for detecting the location of a point of unbalance and the amount of unbalance in a rotatable body, comprising means for supporting said body for rotation about a non-vertical axis, rotation means for rotating said body about said axis, the torque about said axis produced by the gravitational effect of said point of unbalance varying during rotation of said body, detection and measuring means arranged to detect when said torque maximizes and to measure the value of such maximum torque thereby to determine the location of said point of unbalance and the amount of unbalance.

7. Apparatus according to claim 6 which further comprises means for stopping said rotation means when said detection means detects the maximum torque.

8. Apparatus according to claim 6 wherein said detection and measuring means comprises a solenoid including a coil and armature, connecting means operatively connecting said armature to said body for rotation therewith about said axis, mounting means mounting said coil for limited movement relative to said armature and current varying means for progressively decreasing the current supplied to said coil including a potentiometer having a movable contact manually settable to a starting position in which said potentiometer provides a low effective resistance, contact drive motor means for moving said contact so as to increase the effective resistance provided by said potentiometer and motor deenergizing means for deenergizing said contact drive motor means operatively responsive to movement of said armature relative to said coil, the amount of effective resistance afforded by said potentiometer when said contact drive motor means is deenergized being a measure of the amount of said unbalance.

9. Apparatus according to claim 8 which further comprises starting means for energizing said contact drive motor means in response to said contact being manually set in said starting position.

10. Apparatus according to claim 8 which further comprises means operative to stop rotation of said body in response to movement of said armature relative to said coil thereby to determine said location.

11. Apparatus according to claim 8 wherein said rotation means includes body drive motor means, and which further comprises motor starting means for energizing said body drive motor means when said contact is manually set in said starting position and also for energizing said contact drive motor means in response to said contact being set in said starting position.

12. Apparatus according to claim 11 wherein said motor starting means includes time delay means for controlling energization of said contact drive motor means a predetermined time after said contact has been manually set in said starting position.

13. Apparatus according to claim 12 wherein said motor deenergizing means is operative also to deenergize said body drive motor means when said contact drive motor means is deenergized.

* * * * *